(12) United States Patent
Priesemuth (10) Patent No.: US 6,329,621 B1
(45) Date of Patent: Dec. 11, 2001

(54) ELECTRIC SWITCH APPARATUS WITH RESILIENT BENT WIRE CONTACT MEMBERS

(75) Inventor: Wolfgang Priesemuth, Wasserburg (DE)

(73) Assignee: TRW Automotive Electronics & Components GmbH & Co. KG (DE)

(*) Notice: Subject to any disclaimer, the term of this patent is extended or adjusted under 35 U.S.C. 154(b) by 0 days.

(21) Appl. No.: 09/402,818

(22) PCT Filed: Apr. 7, 1998

(86) PCT No.: PCT/EP98/02016

§ 371 Date: Feb. 11, 2000

§ 102(e) Date: Feb. 11, 2000

(87) PCT Pub. No.: WO98/45866

PCT Pub. Date: Oct. 15, 1998

(30) Foreign Application Priority Data

Apr. 8, 1997 (DE) .............................. 197 14 552

(51) Int. Cl.[7] .................................................. H01H 15/06
(52) U.S. Cl. ..................... 200/537; 200/16 D; 200/243
(58) Field of Search ..................... 200/1 R, 1 A, 200/16 R–16 F, 520, 537, 243, 246, 283, 284, 290, 341

(56) References Cited

U.S. PATENT DOCUMENTS

| | | | |
|---|---|---|---|
| 2,932,880 | * 4/1960 | Gallatly et al. | 29/155.55 |
| 4,326,110 | * 4/1982 | Zdanys, Jr. | 200/16 R |
| 4,497,983 | * 2/1985 | Galloway et al. | 200/5 R |
| 4,746,771 | * 5/1988 | Koslar | 200/16 D |
| 5,952,632 | * 9/1999 | Irvine | 200/16 E |

FOREIGN PATENT DOCUMENTS

1145725 * 2/1961 (DE) .................................................

* cited by examiner

*Primary Examiner*—Michael Friedhofer
(74) *Attorney, Agent, or Firm*—Fay, Sharpe, Fagan, Minnich & McKee, LLP (57) ABSTRACT

An electric switch apparatus includes a stationary base plate (2) and an actuating part (6) carrying an electrical conductor member (8) displaceable between at least two positions relative to the base plate. The base plate carries a plurality of elongate resilient contact members (14) adapted to engage the electrical conductor member (8). The conductor member includes a flat metallic electrically conductive material which is selectively brought into contact with the fixed resilient contact members held on the base member when the actuating part is displaced between said first and second positions. A first predetermined electrical connection between the fixed contact members is established when the actuating part is held in the first position. A second predetermined electrical connection between the fixed contact members is established when the actuating part is moved to the second relative position. The contact members are preferably formed as wire contacts having ends attached to the base plate and second free ends formed in the shape of a curved bow contact (12). The electrical conductor configuration is formed by a wiring wafer (8) which connects, electrically, in the two positions of the electrical part, the bow contacts of the wire contacts resting against same under an elastic resilient pre-stressed condition.

20 Claims, 3 Drawing Sheets

ELECTRIC SWITCH APPARATUS WITH RESILIENT BENT WIRE CONTACT MEMBERS

BACKGROUND OF THE INVENTION

The subject invention is directed to the art of electric switches and, more particularly, to miniature electric switch devices of the type that are used where physical size dimensions and electric connection flexibility are constraints. The invention is especially well suited for use in switching circuits within motor vehicles such as, for example, in automotive dash board applications and the like and will be described with particular reference thereto. However, the invention is capable of broader application and can be used in a wide range of other applications.

One such miniature electric switch is taught in DE 31 45 802 C2. The switch in that teaching includes fixed contacts which are formed by strip-shaped contact tongues. The fixed contacts are inserted through a base plate or, alternatively, are cast together integrally with the base plate and are provided with a set of protruding bars formed of an electrically insulating material. An actuating part associated with the fixed contacts is movable relative thereto to effect switch operation. The actuating part carries a conductor configuration formed of flat material. The conductor configuration includes strip-shape contact zones which are movable along a set of fixed contact tongues, so that, based upon the overall design of the electrically insulating bars, electrical connections are either produced or not produced between the contact tongues as they slide on top of each other and selectively engage. This selectively opens and closes electrical circuits. The conductor configuration between the contact tongues is selectively interrupted so that the overall switch can, in effect, be programmed to establish varying switch positions or predetermined electrical connections.

The above switch is relatively expensive in its construction, however. Further, the above switch is limited in the extent to which the switch can be miniaturized due to the construction and overall design of the strip-shaped contacts.

Lately in the electrical switch art, increasing significance has been placed on the miniaturization of the switches, particularly those used in motor vehicle applications. In addition, because of the growing number of comfort-related accessories currently available in motor vehicles, the number of required switches is also rising. At the same time, the physical space available for the switches, particularly the dashboard space in automotive applications, has become smaller and more limited due in part to increased electronic sophistication including the addition of navigation screens, etc. disposed in the dashboard space.

There is a need, therefore, for a miniature electric switch apparatus that is inexpensive to manufacture and that can be easily configured to provide an electrical circuit configuration tailored to specific application needs.

SUMMARY OF THE INVENTION

The subject invention provides an electric switch construction that overcomes the noted problems and results in a switch that requires little space, which is cost-effectively produced, exhibits high functional safety during use, and is readily adaptable to meet a wide range of diverse applications and demands.

In particular, and in accordance with one aspect of the invention, there is provided an electric switch apparatus including a stationary base member, a plurality of elongate resilient contact members on the base member, and an electrical conductor member movable relative to the base member between first and second relative positions. Each of the plurality of elongate resilient contact members has a first end fixedly carried on the base member and a second free end defining a plurality of bow areas. In the first position of the electrical conductor member relative to the base member, the electrical conductor member engages the plurality of bow members to establish a first electrical configuration between the plurality of elongate resilient contact members. In the second position of the electrical conductor member relative to the base member, the electrical conductor member engages the plurality of bow members to establish a second electrical configuration between the plurality of elongate resilient contact members.

In accordance with a more limited aspect of the invention, the plurality of elongate resilient contact members comprise fixed resilient contacts which are formed, preferably, by wires bent in a predetermined manner. It is to be appreciated that such bent wire contacts advantageously need extremely little space and can be produced in a cost effective manner. Further, such wire contacts enable simple attachment to the base plate member.

In accordance with a further limited aspect of the invention, the wire contacts are biased into engagement with the electrical conductor member. The electrical conductor member is carried on an actuating part movable relative to the base member holding the resilient wire contact members so that the electrical conductor configuration engages the bowed areas of the wire contacts as the electrical conductor member moves relative thereto into the first and second positions. The electrical conductor member is formed in a simple fashion as a wiring wafer having a selected wiring or conductor pattern formed thereon. The wiring or conductor pattern is fashioned and arranged to determine the electrical connections between the individual wire contacts to thus adapt the switch for use in particular applications. In that way, different electrical connections between the elongate wire contacts are enabled as the wiring wafer carried on the electrical conductor member is moved between the first and second positions relative to the base member. The bowed areas of the resilient wire contact members are biased into engagement with the electrical conductor member to essentially swipe the electrical conductor member carried on the actuating part as the actuating part moves relative to the base member. The overall electrical function of the subject switch as well as the overall function of the switch positions are advantageously determined by establishing the appropriate desired wiring or conductor pattern formed on the wiring wafer. In that way, a conservation of parts for a reduced inventory is enabled in accordance with the invention. More particularly, a single electrically conductive base bar can be used in the electrical conductor member to accommodate many diverse applications by merely modifying the pattern of exposed electrical conductors or areas on the actuating part to be contacted by the bow areas of the wire contacts.

In accordance with a more limited aspect of the invention, each of the plurality of wire contact members have S-shaped first ends with a free outer end thereof inserted into a respective hole formed in the base member. Further, each of the plurality of the wire contact members have a U-shaped portion adjacent the free outer end. The U-shaped portion is preferably inserted into a respective slot formed in the base member. In that way, a plurality of hole/slot pairs formed on the base member carry a corresponding plurality of resilient wire contact members.

Further in accordance with the invention, the U-shaped portion of the plurality of wire contact members define at least one inwardly oriented bulge adapted to engage an edge of the respective slot formed in the base member to selectively hold the U-shaped portion clipped to the base member. This enables a particularly safe electrical and mechanical connection of the wire contacts into the base plate without requiring the use of soldering or the like.

In accordance with a further limited aspect of the invention, the subject switch apparatus includes a plurality of conductive tracks associated with the base member, preferably formed directly on the base member. When the wire contact members are attached to the slots and holes of the base member, the plurality of conductive tracks become electrically connected with the plurality of wire contact members. In that way, the switch can be connected in a simple fashion to complex electrical circuits or control instruments such as in automotive applications, or the like, using the conductive tracks as switch circuit connections.

Still further in accordance with the invention, the subject switch apparatus further includes a stay member associated with the base member and disposed at a location relative to the electrical conductor member to prevent displacement of the bow areas of the plurality of wire contact members beyond a plane defined by movement of the electrical conductor member between the first and second positions. The stay member prevents the resilient wire contact members from springing beyond their preselected travel limits so that the bowed areas formed thereon are constrained to engage only a single side of the electrical conductor member. Essentially, the stay member prevents the resilient wire contact members from traveling to a side of the electrical conductor member beyond the face side thereof, particularly when the conductor member is removed from engagement with the base member to ensure relative motion between the base member and the electrical conductor member when the conductor member is attached to the base member such as during manufacture of the switch. This makes manufacture of the switch simple and increases the operational safety of the switch during use.

Still further in accordance with the invention, the wiring wafer component of the electrical conductor member of the subject switch apparatus includes a metal stamping element and an electrically insulating cover layer defining a plurality of recess apertures arranged to receive the plurality of bow areas through the recesses and into electrical contact with the metal stamping element.

As can be seen from the foregoing, a primary object of the invention is the provision of an inexpensive miniature electrical switch of the type that can be easily programmed by the mere designation of an appropriate wiring wafer element or electrical conductor member to enable the switch to be used in a wide range of diverse electrical switch applications.

A further object of the invention is the provision of an electrical switch apparatus of the type that uses thin flexible wire contact members that are biased into engagement with the electrical conductor member as it is moved between the first and second positions relative to the base member. The wire contact members are thin so that the overall switch construction is greatly reduced in size.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein:

FIG. 3b shows an electrical schematic representation of the switch of FIG. 1 using the wiring wafer shown in FIG. 3a;

FIG. 4b shows an electrical schematic representation of the switch of FIG. 1 using the wiring wafer embodiment shown in FIG. 4a;

FIG. 5 is a plan view illustrating the arrangement of a conductive element formed in the wiring wafer shown in FIG. 4a;

FIG. 6 is a side elevational view showing a first alternative embodiment of the subject invention for engagement between a stationary wire contact and a movable contact area;

FIG. 7 is a side elevational view of a second alternative embodiment of the subject switch apparatus showing engagement between a stationary wire contact and a movable contact area and a including a stay member;

FIG. 8 shows an enlarged portion of FIG. 2 illustrating the preferred engagement between the wire contact member and the base plate member of the subject electrical switch apparatus;

FIG. 9 shows a side elevational view of a bow area of a wire contact member forming the subject electrical switch apparatus; and, FIG. 10 shows a side cross sectional view of an alternative bowed area portion of an electrical contact member in accordance with an alternative embodiment of the invention.

DETAILED DESCRIPTION OF THE PREFERRED EMBODIMENTS

Figure 1:
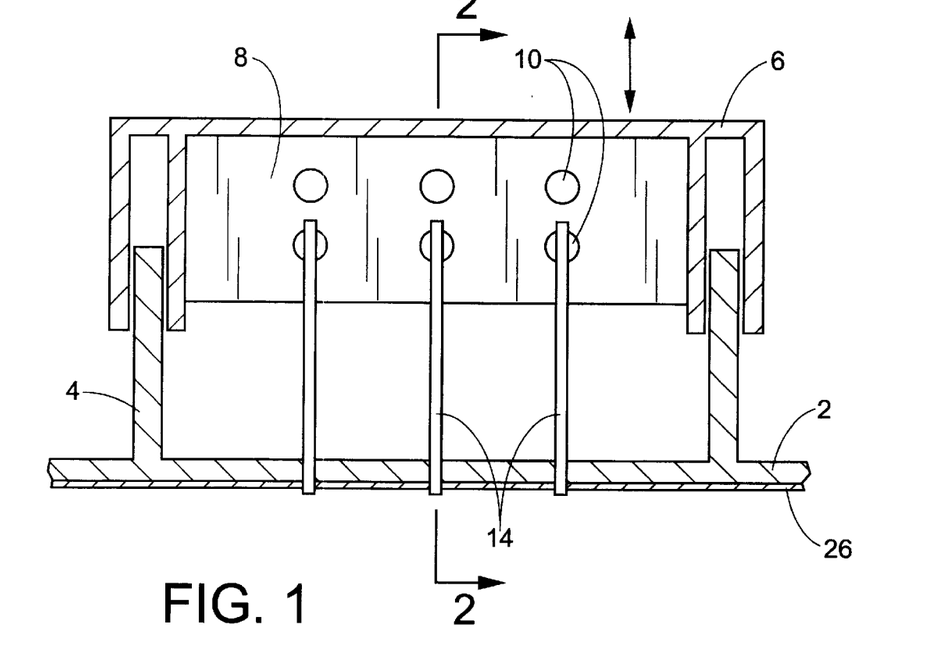
FIG. 1 shows the subject electric switch apparatus of the present invention in partial cross section.

Referring now to the drawings wherein the showings are for the purposes of illustrating the preferred embodiments of the invention only and not for purposes of limiting same, the overall arrangement of the preferred form of an electric switch formed in accordance with the invention can best be seen by reference to FIG. 1. As shown therein, an electric switch apparatus 1 comprises a stationary base member 2, a plurality of elongate resilient contact members 14 carried on the base member 2, and an electrical conductor member 8 carried on an actuating part 6 movable relative to the stationary base member 2. As shown in the Figure, the stationary base member 2 is preferably formed as a single unitary part and includes a pair of spaced apart upwardly extending housing walls 4. The base plate member forms the bottom housing portion of the subject switch apparatus.

The actuating part 6 is movable relative to the base plate member 2 in a guided fashion. To that end, the housing walls 4 engage corresponding portions of the actuating part 6 so that the actuating part 6 is displacebly conducted along the housing walls 4. Preferably, the actuating part 6 is movable vertically as represented by the arrow in FIG. 1 so that the actuating part is movable relative to the base plate member into two extreme travel limits, namely, an inserted position (down in FIG. 1) whereat the actuating part 6 is held close to the base member 2, and a retracted position or a position of repose (up in FIG. 1) whereat the actuating part 6 is spaced apart from the base plate member 2 at its farthest extent. Alternatively, the actuating part 6 can be arranged to occupy several predefined positions between the fully inserted position and the fully retracted positions discussed above. Still further alternatively, the actuating part 6 can be made movable relative to the base member 2 in conjunction with a spring or the like whereby the actuating part and base member are selectively displaced, using an externally applied pressure, from a predefined extreme retracted position to an interior inserted position. The components automatically return to the extreme retracted position when pressure, or the like, is removed owing to the spring force or bias.

The basics of the relative motion between the actuating part and the base member form no part of the present invention and, accordingly, no detailed explanation will be provided here. In addition, the manner in which the actuating part and base member are interconnected also forms no part of the invention and will not be described in specific detail. Such arrangements and constructions are well known in the art and are described in printed publications including DE 31 45 803.

Figure 2:
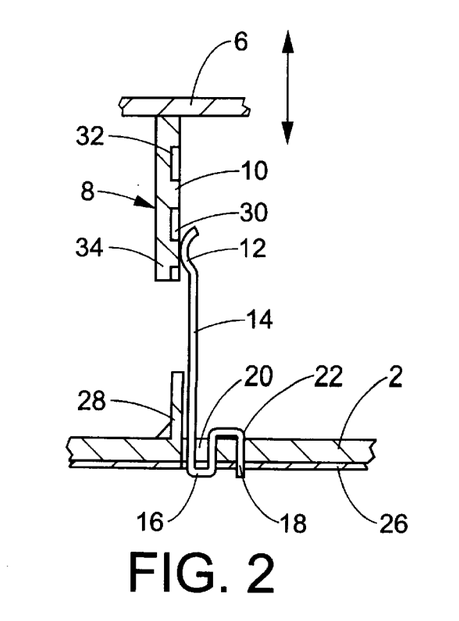
FIG. 2 shows a partial cross-sectional view of the switch shown in FIG. 1 taken along line II—II in FIG. 1.

With yet continued reference to FIG. 1 and with additional reference to FIG. 2, a wiring wafer or a flat electrical conductor member 8 is rigidly connected to the actuating part 6 as shown. Preferably, the electrical conductor member 8 is substantially planar and is mounted on the actuating part to extend approximately parallel to the direction of movement of the actuating part 6 relative to the base plate member 2. The relative movement direction between the base member 2 and the actuating part 6 is illustrated in the vertical direction in FIGS. 1 and 2 by the double-headed arrows.

The wiring wafer or electrical conductor member 8 includes electrical contact areas 10 arranged at various predefined positions on the actuating part 6. Preferably, the contact areas 10 are disposed at appropriate locations on the actuating part 6 so that bow areas formed as bow contacts 12, 40, 42 or contact segments of the plurality of resilient elongate contact members 14 selectively engage the contact areas 10 as the actuating part 6 is moved relative to the stationary base member 2 to the first and second relative positions.

As noted above, the electrical conductor member 8 is, preferably, substantially planar in overall shape and is preferably installed in predefined recesses (not shown) formed on the actuating part 6 and attached to same using an adhesive such as glue, or the like. Alternatively, the electrical conductor member 8 can be glued to stay surfaces (not shown) formed on the actuating part 6 or otherwise fastened to the actuating part 6 using bent or crimped portions (not shown) of the actuating part 6 or the like.

As shown best in FIG. 2, each of the plurality of elongate resilient contact members 14 are formed as resilient wires bent in a predetermined manner. Preferably, the wires are spring wire, such as beryllium wire, which are selectively coated with suitable silver and/or gold plating. A first free end of each wire contact 14 is preferably formed in the shape of a bow contact 12 as shown in the figure. At the opposite free end of each wire contact 14, an S-shape is formed having a U-shaped contact 16 and a free outer end 18. The U-shaped contact 16 of each contact member is inserted into a suitably shaped slot 20 formed in the base plate member 2. The free outer end 18 of each contact member extends through a suitably shaped hole 22 formed in the base plate 2. In this manner, each of the plurality of resilient wire contacts 14 are received into the base member 2 and thereby held in place. This manner of attachment of the wire contacts to the base member ensures a twist-proof secure connection and simplifies manufacturing by enabling simple insertion of the free end of each wire contact in place in the appropriate slots 20 and holes 22 formed in the base member 2.

Figures 6, 7, 8, 9, 10:
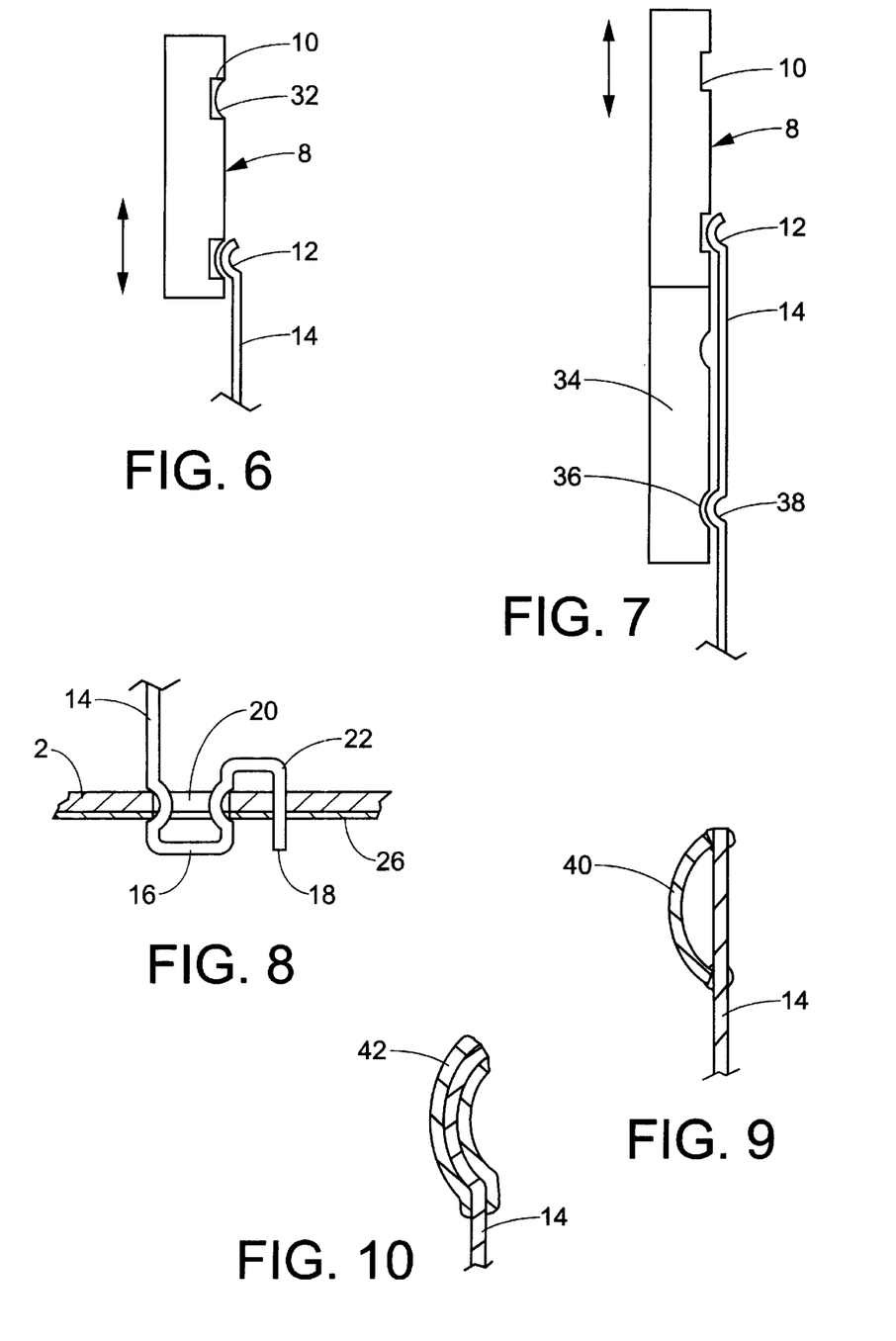

As a further manufacturing enhancement, as shown at FIG. 8, inward bulges 24 are selectively formed in areas of the stays of the U-shaped contacts 16 resulting in a robust locking arrangement between the base member 2 and the contact members. The inward bulges 24 are selectively formed on one or both of the areas of the stays of the U-shaped contacts 16.

With reference yet once again to FIG. 2, the base member 2 is preferably formed as an electrically conductive conductor plate with electrically conductive tracks 26 for establishing electrical contacts with the plurality of resilient wire contacts 14. In particular, it is an advantage of the present invention that the electrically conductive material forming the tracks extends into the walls of the slots 20 and into the holes 22 so that no soldering is needed between the wire contacts 14 and the base member 2 acting as a conductor plate.

As an alternative to the above, the present invention contemplates attachment of the plurality of wire contacts 14 to the base member 2 by other means such as, for example, using a casting process whereby the connection wire is directly soldered or crimped together with the wire contacts or attached to same by other means.

As is evident from FIG. 2, the base member 2 is preferably formed with a plurality of stays 28 arranged at predetermined locations adjacent the corresponding plurality of wire contacts 14. Preferably, the plurality of stays 28 limits movement of the wire contacts 14 in a counter clockwise direction as viewed from the figure. The wire contacts tend toward counter clockwise movement owing to the resilient pre-stressed elastic nature of the material comprising the wire contacts. Preferably, each of the plurality of wire contacts 14 are elastically pre-stressed so that the bow contacts 12 are held engaged with a front face surface of the conductor member. The central body portion of the wire contacts engage the stays 28 to prevent further counter clockwise movement when the actuating part 6 is fully removed from the base member 2 such as during assembly of the subject electrical switch. That is, the stay member 28 prevents displacement of the bow areas 12 of the plurality of contact members 14 beyond a plane defined by movement of the electrical conductor member 8 between the first and second positions relative to the base member 2. In that way, as the subject electrical switch apparatus is manufactured and the actuating part 6 and the base member 2 are brought together toward their assembled arrangement, the electrical conductor member 8 engages the exterior or convex side of the bow contact 12 of the wire contact 14 causing the wire contact members 14 to be arranged on the face side of the conductor member 8 in the position illustrated in FIG. 2.

With yet continued reference to FIG. 2, the electrical conductor member 8 formed in accordance with the first preferred embodiment of the invention includes a layer of non-conductive plastic material 30 disposed relative to the actuating part 6 to face the bow contacts 12. The plastic material defines a set of holes 32 in the areas of the contact areas 10. Preferably, the reverse side of the layer of plastic material 30 includes a metal or other electrically conductive layer 34 which extends through the holes 32 and is exposed in the contact areas 10.

Alternatively, the electrical conductor member 8 can be formed as a metallic base plate selectively covered with a plastic coating which is perforated in selected contact areas. In that embodiment, the contact areas are recessed.

Preferably, the metallic bore plate is formed of Si—Cu and may be additionally selectively silver and/or gold plated.

Figure 5:
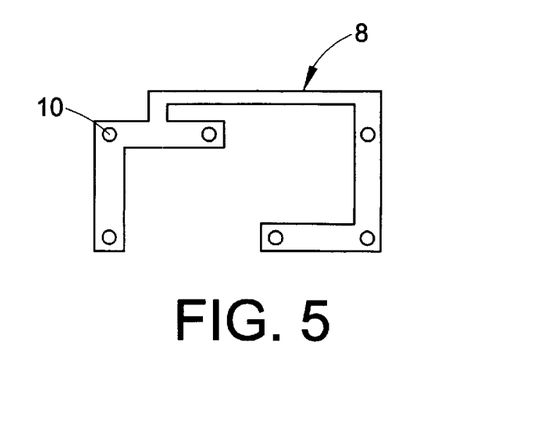

Still alternatively, as shown in FIG. 5, the electrical conductor member 8 is stamped from a metal plate and is thereafter suitably arranged on a base plate preferably consisting of a non-conductive plastic material in a manner that predetermined contact areas are formed and are electrically connected in a single electrical node in a predetermined manner.

Figure 3A:
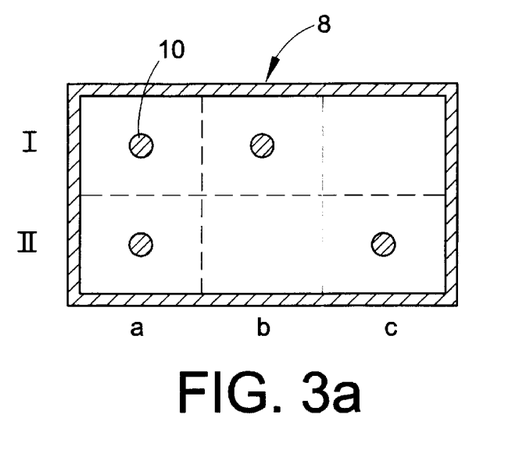
FIG. 3a is a plan view illustrating a first embodiment of a wiring wafer used in the switch apparatus shown in FIG. 1.

FIG. 3a shows a first preferred embodiment of the wiring wafer or electrical conductor member 12 according to the present invention formed as a metal plate. The metal plate is substantially planar and rectangular in overall dimension as shown. The majority of the front face surface of the metal plate is sealed with a layer of a plastic electrically non-conductive material. Only the contact areas 10 are exposed at predetermined positions on the face surface. In the Figure, the cross-hatched circular areas are conductive access areas on the electrical conductor member 8 which, preferably, are electrically linked or connected in a manner to be described below. The illustrated wiring wafer 8 shown in FIG. 3a is used in accordance with a first preferred embodiment of the invention in an electrical switch which has three wire contacts, arranged next to each other.

Figure 3B:
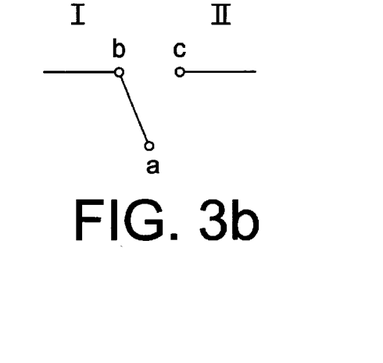

More particularly, with reference now to FIGS. 1, 3a and 3b, the first preferred embodiment of the electrical conductor member 8 is arranged for the subject electrical switch apparatus to operate in one of two selected switch positions I and II. When the subject electrical switch apparatus is disposed in switch position I (actuating part 6 moved relative toward the base member 2), the plurality of contact member 14 engage the pair of contact areas 10 formed on the electrical conductor member 8 along the top row identified in FIG. 3a at I. That is, in switch position I, the plurality of elongate resilient contact members 14 engage the upper left (switch area a) and upper central (switch area b) contact areas 10 of the electrical conductor member 8. In switch position II (actuating part 6 moved relative away from the base member 2), the plurality of elongate resilient contact members 14 engage the bottom left (switch area a) and bottom right (switch area c) contact areas 10 formed on the electrical conductor member 8 along the row identified in FIG. 3a at II.

Preferably, as described above, each of the contact areas 10 are electrically connected. This being the case, the left most wire contact member 14 in switch area a is electrically connected to the metal plate of the electrical conductor member 8 in both positions I and II. Further, for the center wire contact member 14 at switch area b, only a single contact area 10 can be reached when the switch is in position I. In switch position II, the center resilient contact member makes no electrical connection with the metal plate. Lastly, for the right most wire contact member 14 in switch area c, an electrical connection is established with the metal plate when the switch is in position II. In switch position I, the right most resilient contact member makes no electrical connection with the metal plate. FIG. 3b shows an electrical equivalent circuit diagram representative of the subject electric switch apparatus of the present invention using the electrical conductor member 8 shown in FIG. 3a.

Figure 4A:
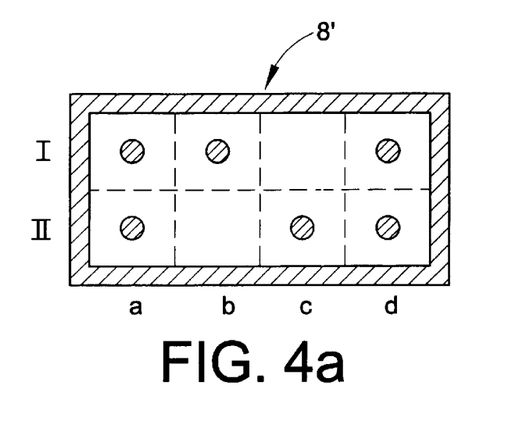
FIG. 4a is a plan view illustrating an alternative embodiment of a wiring wafer used in the switch apparatus shown in FIG. 1.
Figure 4B:
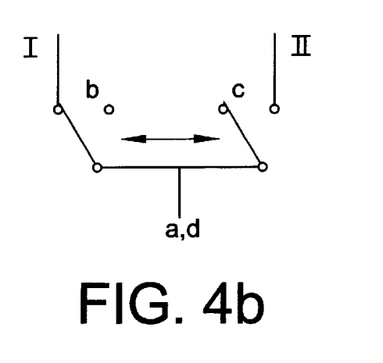

FIG. 4 shows a second preferred embodiment of the electrical conductor member 8' for use with the subject electric switch apparatus. As shown there, the switch is used with a set of four (4) elongate resilient contact members 14 (not shown) disposed in switch areas a, b, c, and d. In switch position I, the left most pair of resilient contact members and the right most contact member at switch areas a, b, and d are electrically connected to the metal plate portion of the electrical conductor member 8'. Correspondingly, in switch position II, the left most elongate resilient contact member and the right most pair of resilient contact members at switch areas a, c, and d are electrically connected through the metal plate of the electrical conductor member 8'. The electrical equivalent circuit diagram is shown in FIG. 4b.

Turning now to FIG. 5, an exemplary embodiment of a metal plate used in the electrical conductor member 8' of FIG. 4 is shown. Preferably, the metal plate is electrically conductive and formed by a stamped metal part whose function corresponds to the wiring wafer described above in connection with FIGS. 4a and 4b. The contact areas 10 may, for example, be formed as recesses so that a mechanical locking will result when the bow contacts 12 reach and embed into the contact areas 10. This is beneficial for a positive tactile touch-feel sensation for operators using the subject electrical switch apparatus.

FIG. 6 shows an alternative embodiment of the subject electric switch apparatus wherein a high quality touch-feel sensation is realized when operating the switch deriving from additional structural elements to be described below. More particularly, the wiring wafer or electrical conductor member 8 defines recesses 32 adjacent the contact areas 10 regardless of whether or not the contact areas are electrically conductive areas into which the bow contacts 12 of the wire contact move or otherwise engage. In the embodiment shown in FIG. 6, due to the elastic pretension of the resilient contact members 14, a predefined retaining force is developed and must be manually overcome in order to move the actuating part into the desired position relative to the base member, preferably vertically as shown in FIG. 6. It is to be understood that the recesses 32 may also be formed at other locations on the electrical conductor member where certain other actuation characteristics of the subject electric switch apparatus are desired. Further, the recesses may be formed by grooves extending crosswise over the wiring wafer 8.

FIG. 7 shows a further modified alternative embodiment of the electrical conductor member 8 having contact areas 10 for use with a modified wire contact member 14 as shown. The electrical conductor member 8 is operative together with an associated stay member 34 which defines a plurality of recesses adapted to receive projections 38 formed on the elongate resilient contact member 14. The projections 38 engage into the recess 36 formed in the stay member 44 when the actuating part 6 (FIG. 2) is displaced relative to the wire contact 14 held stationary in the base member 2 (not shown).

In the embodiment shown in FIG. 7, the wire contact member 14 is elastically pre-stressed into a biased condition to spring toward the left as viewed in the figure. As the conductor member 8 and stay member 34 slide relative to the base member 2 (vertically as shown in the Figure), the bow contact 12 is lifted off projection 38 at the surface of the electrical conductor member when the projection 38 is not disposed in the recess 36. However, when the projection 38 is received into one of the recesses 36, the bow contact 12 rests against the surface of the electrical conductor member 8 for establishing electric connection therewith. Accordingly, the embodiment shown in FIG. 7 provides additional free space for the design of the electrical conductor member 8 and allows for an enhanced tactile or touch-feel sensation during actuation of the switch.

In addition to the above, other embodiments of the electrical conductor member 8 are contemplated in the present invention. As an example, a plurality of electrical conductor members 8 can be suitably arranged on a single actuating part in a row or at four internal sides of a compartment formed by the actuating part. Each of the electrical conductor members are preferably assigned to a corresponding plurality of wire contact members 14 held on a base plate 2. In this manner, it is possible to directly attach a highly complex switch with extensive miniaturization to a conductor plate.

Turning now to FIG. 8, the preferred method of attaching the plurality of resilient contact members 14 to the base member 2 will be described in greater detail. As shown, the wire contact member 14 defines a set of inward bulges 24 formed at the legs of the U-shaped contact 16. The inward bulges 24 formed on the wire contacts 14 assure secure retention of the wire contacts to the base plate 2.

With continued reference to FIG. 8, electrically conductive tracks 26 are formed relative to the base member 2 and the wire contact 14 as shown. The conductive tracks 26 are preferably formed of a metallic material and are disposed on the base member 2 to extend along the front walls of the slots 20 and the walls of the holes 22 so that secure electrical connection is assured between the wire contacts 14 and the conductive tracks 26.

FIG. 9 shows an alternative contact lug embodiment 40 carried on an elongate resilient contact member 14. As shown there, the bow contact area of the contact wire is not only formed by being bent into the shape of a bow contact, but rather, it is attached by means of soldering or welding, for example, to the wire contact 14. Preferably, the contact lug 40 is made of a suitable highly conductive material which may, in addition, be gold or silver plated.

FIG. 10 shows a third alternative embodiment of a bow contact end of the elongate resilient contact members 14 of the invention. As shown in FIG. 10, the bow area is formed using a small tube 42 of suitable contact material mechanically pushed onto the end of the wire contact 14. The bent shape is preferably achieved by mechanically deforming the small tube 42 formed on the wire contact 14 such as by using a pressing tool or the like.

Both of the embodiments shown above in connection with FIGS. 9 and 10 are advantageous in that only the contact lug and small tube portions of the wire contacts need to be highly electrically conductive such as by gold or silver plating, for example. This reduces the cost of the switch. Further, the embodiments shown in FIGS. 9 and 10 are advantageous in that the bow region, with respect to the material and shape, can be adapted quite effectively for long-term operating life of the electrical conductor member 8.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. An electric switch apparatus comprising:

a base member;

a plurality of elongate resilient contact members, each of the plurality of contact members having first ends carried on said base member and second ends defining a plurality of bow areas; and, an electrical conductor member movable relative to said base member between first and second relative positions, in said first relative position the electrical conductor member engaging said plurality of bow areas to establish a first predetermined mutual electrical connection between a first and a second contact member among the plurality of elongate resilient contact members and, in said second relative position the electrical conductor member engaging said plurality of bow areas to establish a second predetermined mutual electrical connection between said first contact member and a third contact member among the plurality of elongate resilient contact members.

2. The switch apparatus according to claim 1 where said plurality of elongate resilient contact members are resiliently biased to engage said plurality of bow areas into contact with said electrical conductor member.

3. The switch apparatus according to claim 2 further including an actuating member adapted for movement relative to the base member, the actuating member carrying said electrical conductor member between said first and second relative positions.

4. The switch apparatus according to claim 3 further including a plurality of electrical conductor members carried on said actuating member.

5. The switch apparatus according to claim 3 wherein said plurality of bow areas form curved electrical contact portions of said plurality of elongate contact members.

6. The switch apparatus according to claim 3 wherein said plurality of elongate contact members carry electrical contact portions in said bow areas.

7. The switch apparatus according to claim 6 wherein said electrical contact portions are electrical contact lugs bent into the shape of bow contacts and attached to said plurality of contact members.

8. An electric switch apparatus comprising:

a base member;

a plurality of elongate resilient contact members each of the plurality of contact members having first ends carried on said base member and second ends defining a plurality of bow areas;

an electrical conductor member movable relative to said base member between first and second relative positions, in said first relative position the electrical conductor member engaging said plurality of bow areas to establish a first electrical configuration between the plurality of elongate resilient contact members and, in said second relative position the electrical conductor member engaging said plurality of bow areas to establish a second electrical configuration between the plurality of elongate resilient contact members, said plurality of elongate resilient contact members being resiliently biased to engage said plurality of bow areas into contact with said electrical conductor member;

an actuating member adapted for movement relative to the base member, the actuating member carrying said electrical conductor member between said first and second relative positions; and, wherein said plurality of contact members comprise a plurality of wire contact members, each of the plurality of wire contact members having S-shaped first ends with a free outer end inserted into a respective hole formed in said base member and a U-shaped portion adjacent said free outer end inserted into a respective slot formed in said base member.

9. The switch apparatus according to claim 8 wherein the U-shaped portion of each of said plurality of wire contact members defines at least one inwardly oriented bulge selectively disposed to engage with the base member to selectively hold the U-shaped portion clipped to the base member.

10. The switch apparatus according to claim 9 further including a plurality of conductive tracks associated with said base member, the plurality of conductive tracks being electrically connected with said plurality of wire contact members.

11. The switch apparatus according to claim 10 further including a stay member associated with said base member and disposed at a location relative to the electrical conductor member to prevent displacement of said bow areas of the plurality of wire contact members beyond a plane defined by movement of said electrical conductor member between said first and second relative positions.

12. The switch apparatus according to claim 11 wherein said electrical conductor member includes a wiring wafer formed of a metal stamping element.

13. The switch apparatus according to claim 12 wherein said wiring wafer includes:
 a metal stamping element; and,
 an electrically insulating cover layer defining a plurality of recess apertures arranged to receive said plurality of bow areas into electrical contact with said metal stamping element, the metal stamping element and the insulating cover layer defining said first and second electrical connections.

14. The switch apparatus according to claim 11 where said electrical conductor member includes an electrically conductive plate defining said first and second electrical connections and forming a set of electrical contact areas arranged relative to said actuating member for selective engagement with said plurality of bow areas.

15. The switch apparatus according to claim 8 wherein said wire contact members comprise tubes pushed onto the wire contact members in the bow areas of said wire contact members, said tubes being press-fitted onto said wire contact members into the shape of bow contacts.

16. An electric switch apparatus comprising:
 a base member;
 a plurality of elongate resilient contact members, each of the plurality of contact members having first ends carried on said base member and second ends defining a plurality of bow areas;
 an electrical conductor member movable relative to said base member between first and second relative positions, in said first relative position the electrical conductor member engaging said plurality of bow areas to establish a first electrical configuration between the plurality of elongate resilient contact members and, in said second relative position the electrical conductor member engaging said plurality of bow areas to establish a second electrical configuration between the plurality of elongate resilient contact members, said plurality of elongate resilient contact members being resiliently biased to engage said plurality of bow areas into contact with said electrical conductor member; and,
 an actuating member adapted for movement relative to the base member, the actuating member carrying said electrical conductor member between said first and second relative positions;
 wherein at least a one of said actuating member and said electrical conductor member define recesses selectively disposed to receive or otherwise engage said plurality of elongate contact members for developing an actuating force that must be overcome to effect relative motion between said electrical conductor member and said base member.

17. An electric switch apparatus comprising:
 a base member;
 a plurality of elongate resilient contact members, each of the plurality of contact members having first ends carried on said base member and second ends defining a plurality of bow areas;
 an electrical conductor member movable relative to said base member between first and second relative positions, in said first relative position the electrical conductor member engaging said plurality of bow areas to establish a first electrical configuration between the plurality of elongate resilient contact members and, in said second relative position the electrical conductor member engaging said plurality of bow areas to establish a second electrical configuration between the plurality of elongate resilient contact members, said plurality of elongate resilient contact members being resiliently biased to engage said plurality of bow areas into contact with said electrical conductor member;
 an actuating member adapted for movement of said electrical conductor member relative to the base member, the actuating member carrying said electrical conductor member between said first and second relative positions; and,
 wherein:
  the electrical conductor member is associated with a plastic stay member carried for movement relative to the base member together with the electrical conductor member; and,
  the plurality of elongate contact members include projection portions disposed to selectively engage in recess portions of said plastic stay member, the plurality of elongate contact members engaging said electrical conductor member when said projection portions are engaged in said recess portions of said plastic stay member, and the plurality of elongate contact members disengaging said electrical conductor member when said projection portions are spaced apart from said recess portions of said plastic stay member.

18. An electric switch apparatus comprising:
 a base member;
 a plurality of elongate resilient contact members, each of the plurality of contact members having first ends carried on said base member and second ends defining a plurality of bow areas;
 an electrical conductor member movable relative to said base member between first and second relative positions, in said first relative position the electrical conductor member engaging said plurality of bow areas to establish a first electrical configuration between the plurality of elongate resilient contact members and, in said second relative position the electrical conductor member engaging said plurality of bow areas to establish a second electrical configuration between the plurality of elongate resilient contact members; and,
 wherein said plurality of contact members comprise a plurality of wire contact members, each of the plurality of wire contact members having S-shaped first ends with a free outer end inserted into a respective hole formed in said base member and a U-shaped portion adjacent said free outer end inserted into a respective slot formed in said base member.

19. An electric switch apparatus comprising:

a base member;

a plurality of elongate resilient contact members, each of the plurality of contact members having first ends carried on said base member and second ends defining a plurality of bow areas;

an electrical conductor member movable relative to said base member between first and second relative positions, in said first relative position the electrical conductor member engaging said plurality of bow areas to establish a first electrical configuration between the plurality of elongate resilient contact members and, in said second relative position the electrical conductor member engaging said plurality of bow areas to establish a second electrical configuration between the plurality of elongate resilient contact members;

an actuating member adapted for movement of said electrical conductor member relative to the base member, the actuating member carrying said electrical conductor member between said first and second relative positions; and, wherein at least a one of said actuating member and said electrical conductor member define recesses selectively disposed to receive or otherwise engage said plurality of elongate contact members for developing an actuating force that must be overcome to effect relative motion between said electrical conductor member and said base member.

20. An electric switch apparatus comprising:

a base member;

a plurality of elongate resilient contact members, each of the plurality of contact members having first ends carried on said base member and second ends defining a plurality of bow areas;

an electrical conductor member movable relative to said base member between first and second relative positions, in said first relative position the electrical conductor member engaging said plurality of bow areas to establish a first electrical configuration between the plurality of elongate resilient contact members and, in said second relative position the electrical conductor member engaging said plurality of bow areas to establish a second electrical configuration between the plurality of elongate resilient contact members; and, wherein:

the electrical conductor member is associated with a plastic stay member carried for movement relative to the base member together with the electrical conductor member; and, the plurality of elongate contact members include projection portions disposed to selectively engage in recess portions of said plastic stay member, the plurality of elongate contact members engaging said electrical conductor member when said projection portions are engaged in said recess portions of said plastic stay member, and the plurality of elongate contact members disengaging said electrical conductor member when said projection portions are spaced apart from said recess portions of said plastic stay member.

* * * * *